US012436602B2

United States Patent
Wu et al.

(10) Patent No.: US 12,436,602 B2
(45) Date of Patent: Oct. 7, 2025

(54) HAND TRACKING DEVICE, SYSTEM, AND METHOD

(71) Applicant: HTC Corporation, Taoyuan (TW)

(72) Inventors: Chien-Min Wu, Taoyuan (TW); Min Chia Wei, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/409,807

(22) Filed: Jan. 11, 2024

(65) Prior Publication Data

US 2025/0004541 A1    Jan. 2, 2025

Related U.S. Application Data

(60) Provisional application No. 63/523,649, filed on Jun. 28, 2023.

(51) Int. Cl.
*G06F 3/01*    (2006.01)
*G06T 7/20*    (2017.01)
*G06T 13/40*   (2011.01)
*G06T 15/00*   (2011.01)

(52) U.S. Cl.
CPC ............. *G06F 3/011* (2013.01); *G06T 7/20* (2013.01); *G06T 13/40* (2013.01); *G06T 15/00* (2013.01); *G06T 2207/30196* (2013.01)

(58) Field of Classification Search
CPC . G06F 3/011; G06T 7/20; G06T 13/40; G06T 15/00; G06T 2207/30196

USPC ......................................................... 345/156
See application file for complete search history.

(56) References Cited

U.S. PATENT DOCUMENTS

| | | | |
|---|---|---|---|
| 9,870,056 B1 | 1/2018 | Yao | |
| 10,656,721 B2 | 5/2020 | Song et al. | |
| 2017/0235372 A1 | 8/2017 | Song et al. | |
| 2018/0285636 A1* | 10/2018 | Fei | G02B 27/017 |
| 2020/0097071 A1* | 3/2020 | Johnston | G02B 27/0176 |
| 2021/0055793 A1 | 2/2021 | Lin | |

OTHER PUBLICATIONS

"Office Action of Taiwan Counterpart Application", issued on Sep. 30, 2024, p. 1-p. 5.
"Search Report of Europe Counterpart Application", issued on Oct. 24, 2024, p. 1-p. 5.

* cited by examiner

*Primary Examiner* — Jimmy H Nguyen
(74) *Attorney, Agent, or Firm* — JCIPRNET

(57) ABSTRACT

This disclosure provides a hand tracking device. The hand tracking device includes a storage circuit and a processor. The storage circuit stores a program code. The processor is coupled to the storage circuit and accesses the program code. The processor is configured to obtain a hand motion curve of a hand during a period of time. The processor is configured to obtain an object motion curve of an object during the period of time. The processor is configured to determine whether the hand is holding the object based on the hand motion curve and the object motion curve.

19 Claims, 5 Drawing Sheets

HAND TRACKING DEVICE, SYSTEM, AND METHOD

CROSS-REFERENCE TO RELATED APPLICATION

This application claims the priority benefit of U.S. provisional application Ser. No. 63/523,649, filed on Jun. 28, 2023. The entirety of the above-mentioned patent application is hereby incorporated by reference herein and made a part of this specification.

BACKGROUND

Technical Field

The disclosure relates to a hand tracking device; particularly, the disclosure relates to a hand tracking device, a hand tracking system, and a hand tracking method.

Description of Related Art

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

SUMMARY

The disclosure is direct to a hand tracking device, a hand tracking system, and a hand tracking method, so as to improve an accuracy of hand tracking while an object is held by the hand.

In this disclosure, a hand tracking device is provided. The hand tracking device includes a storage circuit and a processor. The storage circuit stores a program code. The processor is coupled to the storage circuit and accesses the program code. The processor is configured to obtain a hand motion curve of a hand during a period of time. The processor is configured to obtain an object motion curve of an object during the period of time. The processor is configured to determine whether the hand is holding the object based on the hand motion curve and the object motion curve.

In this disclosure, a hand tracking system is provided. The hand tracking system includes a camera, a tracker, a storage circuit, and a processor. The camera is configured to provide image data. The tracker is configured to provide tracker data. The tracker is adapted to be placed on an object. The storage circuit store a program code. The processor is coupled to the storage circuit and accessing the program code to execute: receiving the image data from the camera; determining a hand motion curve of a hand during a period of time based on the image data; receiving the tracker data from the tracker; determining the object motion curve of the object during the period of time based on the tracker data; and determining whether the hand is holding the object based on the hand motion curve and the object motion curve.

In this disclosure, a hand tracking method is provided. The hand tracking method includes: obtaining a hand motion curve of a hand during a period of time; obtaining an object motion curve of an object during the period of time; and determining whether the hand is holding the object based on the hand motion curve and the object motion curve.

Based on the above, according to the hand tracking device, the hand tracking system, and the hand tracking method, the accuracy of hand tracking is improved while an object is held by the hand.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
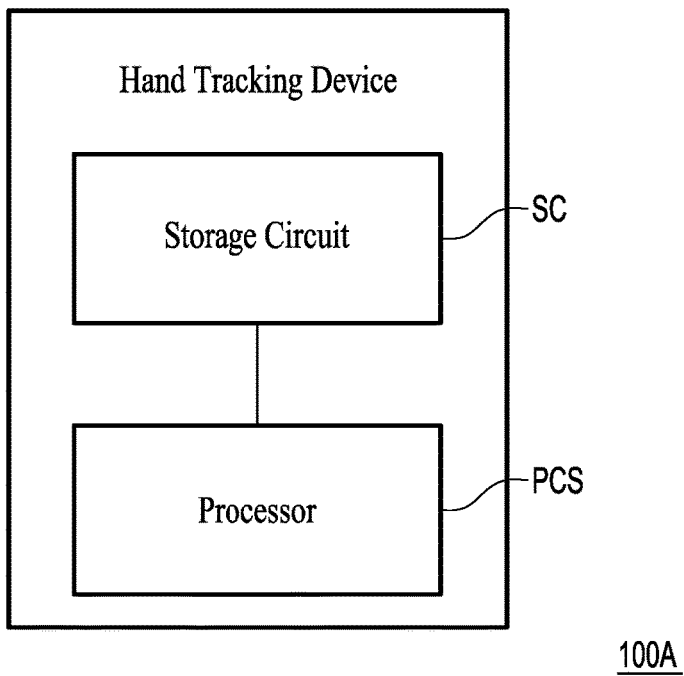
FIG. 1A is a schematic diagram of a hand tracking device according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

Hand tracking is often used to improve the immersive experience. For example, hand tracking may eliminate the need for controllers, allowing users to interact with the virtual world in a more natural and intuitive way, just like they would in the real world. However, while grabbing an object with the hand is involved in the hand tracking, some challenges may appear. For example, the camera might misinterpret shadows, reflections, or even parts of the object as the user's body, triggering unintended interactions or causing the virtual environment to glitch. This may be confusing and disruptive to the user's flow. Further, Most VR headsets may have limited camera field of view (FOV), leaving certain areas around the user invisible to the system. This may lead to awkward situations where the user's hand disappears into a blind spot or objects suddenly appear out of thin air. In addition, there are an enormous number of different types of objects in the world, and they can vary greatly in their appearance. This makes it difficult to use images to identify the type of an object accurately. Therefore, it is the pursuit of people skilled in the art to perform the hand tracking in a more natural and intuitive way while an object is involved.

FIG. 1A is a schematic diagram of a hand tracking device according to an embodiment of the disclosure. With reference to FIG. 1A, a hand tracking device 100A is depicted. In different embodiments, a hand tracking device 100A may be implemented as various smart devices and/or computer devices, but is not limited thereto.

In FIG. 1A, the hand tracking device 100A includes a storage circuit SC and a processor PCS. The storage circuit SC is, for example, any type of fixed or removable random access memory (RAM), read-only memory (ROM), flash memory, hard disk, other similar devices, or a combination of these devices and may be used to record multiple program codes or modules.

The processor PCS is coupled to the storage circuit SC and may be a general purpose processor, a special purpose processor, a conventional processor, a digital signal processor, multiple microprocessors, one or more microprocessors combined with a digital signal processor core, a controller, a microcontroller, an application specific integrated circuit (ASIC), a field programmable gate array (FPGA), any other kind of integrated circuits, state machines, processors based on advanced RISC machine (ARM), and the like.

In an embodiment of the invention, the processor PCS may access the modules and program codes recorded in the storage circuit SC to implement a hand tracking method proposed by the disclosure, and the details of which are described below.

Figure 1B:
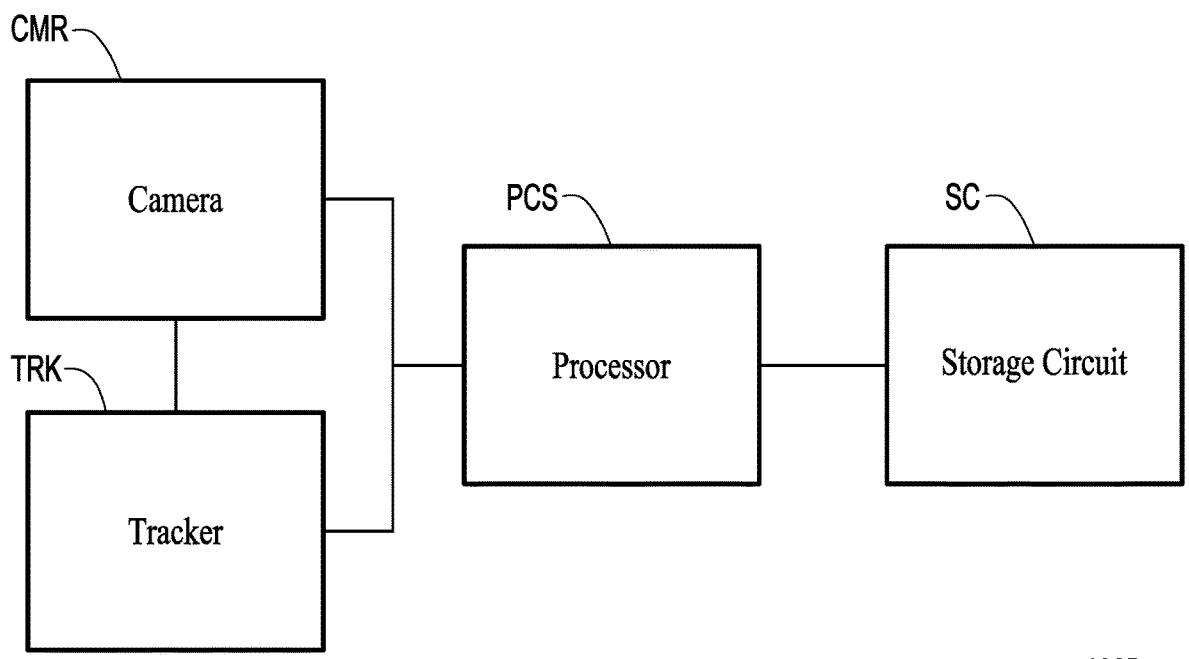
FIG. 1B is a schematic diagram of a hand tracking system according to an embodiment of the disclosure.

FIG. 1B is a schematic diagram of a hand tracking system according to an embodiment of the disclosure. With reference to FIG. 1B, a hand tracking system 100B may include a camera CMR, a tracker TRK, a storage circuit SC, and a processor PCS. In one embodiment, the camera CMR, the storage circuit SC, and/or the processor PCS may be integrated in a single electronic device (e.g., the hand tracking device 100A) or separated from the each other, but is not limited thereto. In one embodiment, the camera CMR may be included in a head-mounted display (HMD) device and the tracker TRK may be attached to or included in an object. In another embodiment, the camera CMR may be placed somewhere other than a head of the user to capture images of the user. However, this disclosure is not limited thereto. In addition, for the sake of convenience in explanation, in the following embodiments, although it is depicted that the HMD device is worn by the user, it is to be noted that the user does not need to wear the HMD device.

In one embodiment, the camera CMR may include, for example, a complementary metal oxide semiconductor (CMOS) camera or a charge coupled device (CCD) camera. In one embodiment, the camera 110 may be disposed on a HMD device, wearable glasses (e.g., AR/VR goggles), an electronic device, other similar devices, or a combination of these devices. However, this disclosure is not limited thereto.

In one embodiment, the HMD device may be configured to display content of AR, VR, MR, or XR. The HMD device may include, for example, a headset, wearable glasses (e.g., AR/VR goggles), other similar devices adapted for AR, VR, MR, XR or other reality related technologies, or a combination of these devices. However, this disclosure is not limited thereto.

In one embodiment, the tracker TRK may include, for example, a gyroscope, an accelerometer, an inertial measurement unit (IMU) sensor, other similar devices, or a combination of these devices. Further, the tracker TRK may be associated with the object OBJ to provide information of the object OBJ. For example, the tracker TRK may be configured to provide three linear acceleration values (e.g., position) and/or three angular velocities (e.g., rotation) related to three axes. However, this disclosure is not limited thereto.

In one embodiment, each component in the hand tracking system 100B may include a communication circuit and the communication circuit may include, for example, a wired network module, a wireless network module, a Bluetooth module, an infrared module, a radio frequency identification (RFID) module, a Zigbee network module, or a near field communication (NFC) network module, but the disclosure is not limited thereto. That is, each component in the hand tracking system 100B may communicate with each other through either wired communication or wireless communication.

In one embodiment, the processor PCS may transmit data to and receive data from the camera CMR, the tracker TRK, and the storage circuit SC. Further, the processor PCS may access program codes recorded in the storage circuit SC to implement a hand tracking method proposed by the disclosure, and the details of which are described below.

Figure 2:
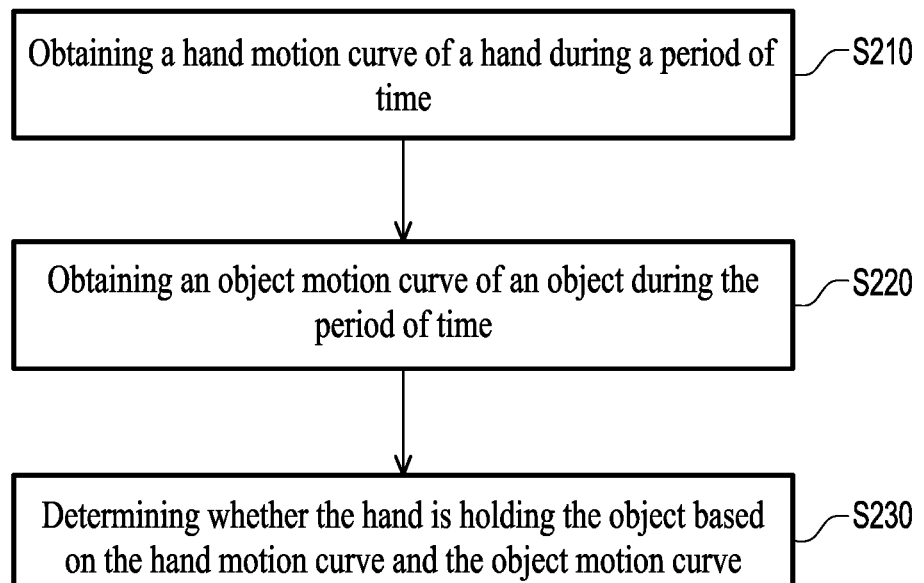
FIG. 2 is a schematic flowchart of a hand tracking method according to an embodiment of the disclosure.

FIG. 2 is a schematic flowchart of a hand tracking method according to an embodiment of the disclosure. With reference to FIG. 1A, FIG. 1B and FIG. 2, a hand tracking method 200 may be executed by the hand tracking device 100A in FIG. 1A or the hand tracking system 100B in FIG. 1B, and the details of each step in FIG. 2 will be described below with the components shown in FIG. 1A or FIG. 1B.

First, in a step S210, the processor PCS may be configured to obtain a hand motion curve of a hand during a period of time. Next, in a step S220, the processor PCS may be configured to obtain an object motion curve of an object during the period of time. Afterwards, in a step S230, the processor PCS may be configured to determine whether the hand is holding the object based on the hand motion curve and the object motion curve.

In this manner, based on the hand motion curve and the object motion curve, whether the hand is holding the object may be determined. That is, a hand holding algorithm may be performed based on the hand motion curve and the object motion curve. Therefore, while the object is involved, the hand tracking of the hand may be still performed in a natural and intuitive way, thereby bringing a fully immersive experience to the user.

In addition, the implementation details of the hand tracking method 200 may be referred to the following descriptions to obtain sufficient teachings, suggestions, and implementation embodiments, while the details are not redundantly described seriatim herein.

Figure 3A:
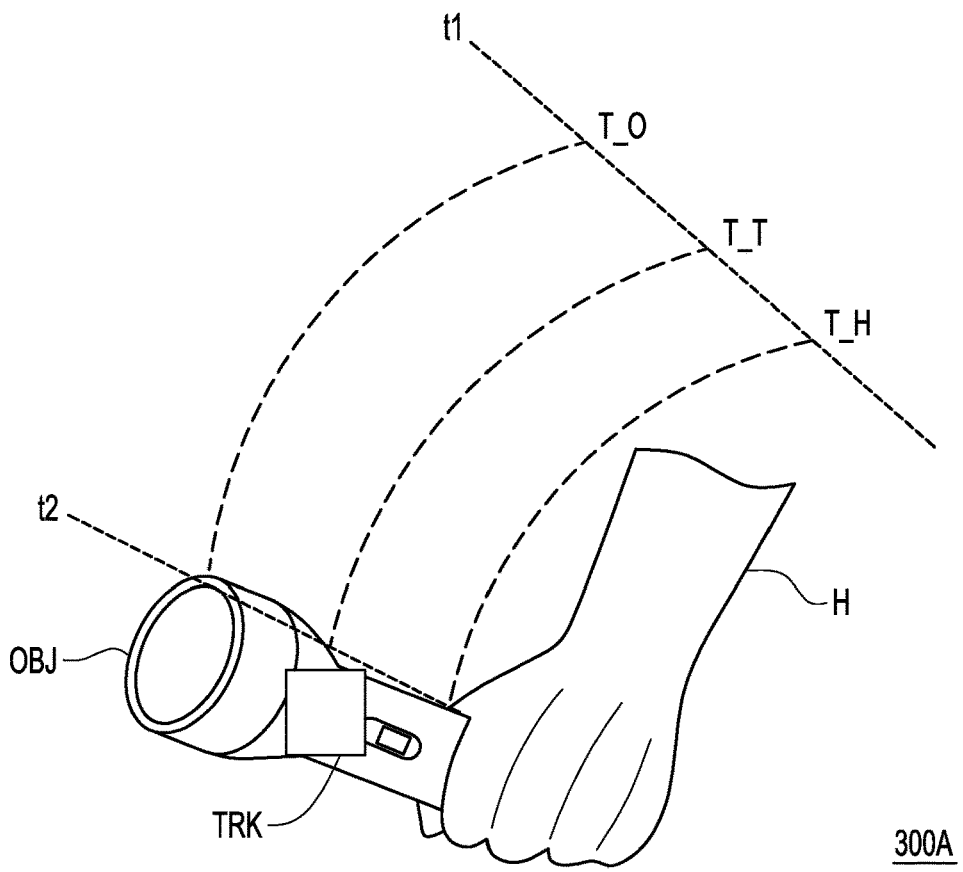
FIG. 3A is a schematic diagram of a hand tracking scenario according to an embodiment of the disclosure.

FIG. 3A is a schematic diagram of a hand tracking scenario according to an embodiment of the disclosure. With reference to FIG. 3A, a hand tracking scenario 300A may include a hand H, an object OBJ, and a tracker TRK. In the hand tracking scenario 300A, the hand H may be holding the object OBJ and The tracker TRK may be placed on (e.g., included in or attached to) the object OBJ.

In one embodiment, during a period of time (from a time t1 to a time t2), the user may move the hand H. As shown, in FIG. 3A, a track T_H may represent a movement track of the hand H during the period of time. Further, since the object OBJ is held by the hand H, a track T_O may represent a movement track of the object OBJ during the period of time and the track T_O may be similar as the track T_H. Furthermore, since the tracker TRK is placed on the object OBJ, a track T_T may represent a movement track of the tracker TRK during the period of time and the track T_T may be similar as the track T_O. In one embodiment, the track T_H may be also called as a hand motion curve, and the track T_O may be also called as an object motion curve.

It is worth mentioned that, while the hand H is holding the object OBJ, no matter how the hand H moves, the object OBJ may move similarly. Further, since the tracker TRK is placed on the object OBJ, tracker data of the TRK may be used to represent not only the movement of the tracker TRK, but also the movement of the OBJ. Therefore, by obtaining tracker data from the tracker TRK, the track T_T may be determined. Meanwhile, based on the location on the object OBJ where the tracker TRK is placed, the track T_T may be converted to the track T_O. Furthermore, by comparing the track T_O and the track T_H, a similarity between these two tracks may be obtained. In one embodiment, the similarity may be determined based on a curve fitting algorithm, but is not limited thereto. That is, the processor PCS may be configured to determine a similarity between the track T_H and the track T_O. Moreover, in response to the similarity being higher than a predetermined threshold value, the processor PCS may be configured to determine that the hand H is holding the object OBJ. On the other hand, in response to the similarity not being higher than the predetermined threshold value, the processor PCS may be configured to determine that the hand H is not holding the object OBJ. Therefore, while the object OBJ is involved, the hand tracking of the hand H may be still performed in a natural and intuitive way, thereby bringing a fully immersive experience to the user.

In addition, while the hand H (e.g., left hand) of the user is being tracked, an additional hand (e.g., right hand) of the user may be tracked at the same time. Further, the user may use one of the hand H and the additional hand to hold the object OBJ. However, since the hand H and the additional hand may look similar, sometimes a hand tracking algorithm may fail to mix up or fail to distinguish between the hand H and the additional hand. That is, the hand tracking algorithm may sometimes be confused that which hand is holding the object OBJ based on the hand tracking algorithm itself only. It is noted that, no matter the object OBJ is held by the hand H or the additional hand, the one holding the object OBJ may have a track similar as the track T_O. Therefore, by comparing the track T_O, the track T_H, and a track of the additional hand, which hand is holding the object OBJ may be determined. In other words, the processor PCS may be configured to obtain an additional hand motion curve of the additional hand during the period of time. Further, the processor PCS may be configured to determine whether the hand or the additional hand is holding the object OBJ based on the hand motion curve, the additional hand motion curve, and the object motion curve. Therefore, the hand H and the additional hand may be distinguish easily, thereby increasing the user experience.

In one embodiment, the track T_H may be generated based on image data provided from the camera CMR and the track T_O may be generated based on tracker data provided from the tracker TRK. For example, the image data may include images of the hand H and/or the additional hand of the user. In addition, the tracker data may include acceleration values and/or angular velocities related to three axes (e.g., X, Y, Z axes) of the object OBJ. However, this disclosure is not limited thereto. That is, the processor PCS may be configured to receive the image data from the camera CMR. Further, the processor PCS may be configured to determine the hand motion curve based on the image data. Furthermore, the processor PCS may be configured to receive the tracker data from the tracker TRK. The tracker TRK may be adapted to be placed on or attached to the object OBJ. For example, based on a size or a weight of the tracker TRK, bolts, screws, straps, tapes or the like may be used to mount the tracker TRK on the object OBJ. Moreover, the processor PCS may be configured to determine the object motion curve based on the tracker data. Therefore, while the object OBJ is involved, the hand tracking of the hand H may be still performed in a natural and intuitive way, thereby bringing a fully immersive experience to the user.

Figure 3B:
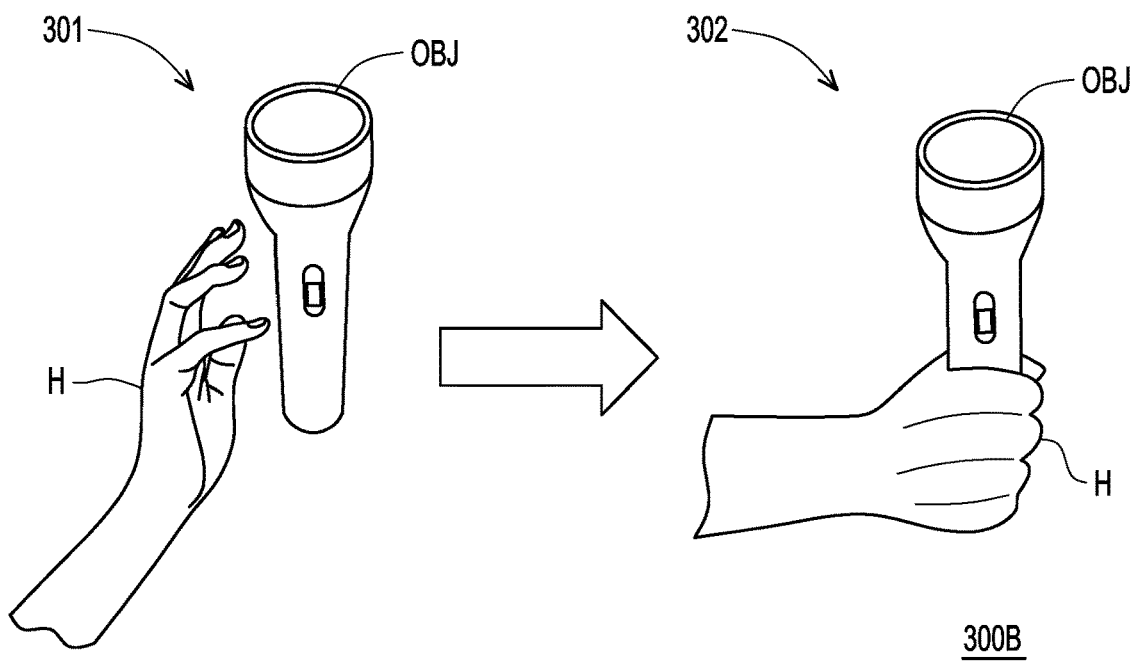
FIG. 3B is a schematic diagram of a hand tracking scenario according to an embodiment of the disclosure.

FIG. 3B is a schematic diagram of a hand tracking scenario according to an embodiment of the disclosure. With reference to FIG. 3B, a hand tracking scenario 300B may include a scenario 301 and a scenario 302. It is noted that, FIG. 3B has been simplified for the sake of clarity to better understand this disclosure. For example, although it is not depicted, the tracker TRK may be placed on the object OBJ. However, this disclosure is not limited thereto.

Reference is first made to the scenario 301. In one embodiment, the hand H may not be holding the object OBJ. In other words, a holding status of the hand H may be not holding anything. Based on the holding status, a virtual hand of an avatar corresponding to the user and a virtual object may be displayed in a virtual world. That is, the processor PCS may be configured to display the virtual hand and the virtual object in the virtual world. Further, the processor PCS may be configured to: in response to the hand H not being holding the object OBJ being determined, display the virtual hand being not holding the virtual object.

Reference is now made to the scenario 302. In one embodiment, the hand H may be holding the object OBJ. In other words, a holding status of the hand H may be holding the object OBJ. Based on the holding status, a virtual hand of an avatar corresponding to the user and a virtual object may be displayed in a virtual world. That is, the processor PCS may be configured to display the virtual hand and the virtual object in the virtual world. Further, the processor PCS may be configured to: in response to the hand H being holding the object OBJ being determined, display the virtual hand being holding the virtual object.

It is worth mentioned that, the holding status of the hand H may be determined based on the track T_H and the track T_O as described in the FIG. 3A. Therefore, the hand H and the object OBJ may be tracked correctly and the virtual hand and the virtual object in the virtual world may be displayed in a realistic manner, thereby bringing a fully immersive experience to the user.

In one embodiment, a hand tracking of the hand H may be performed based on the track T_H and an object tracking of the object OBJ may be performed based on the track T_O. Further, based on a hand tracking result of the hand tracking and an object tracking result of the object tracking, a virtual hand of an avatar corresponding to the user and a virtual object may be displayed in a virtual world. That is, the processor PCS may be configured to display the virtual hand and the virtual object in the virtual world. Further, the processor PCS may be configured to move the virtual hand based on the hand motion curve (utilizing a hand tracking algorithm). Furthermore, the processor PCS may be configured to move the virtual object based on the object motion curve (utilizing an object tracking algorithm).

Figure 4A:
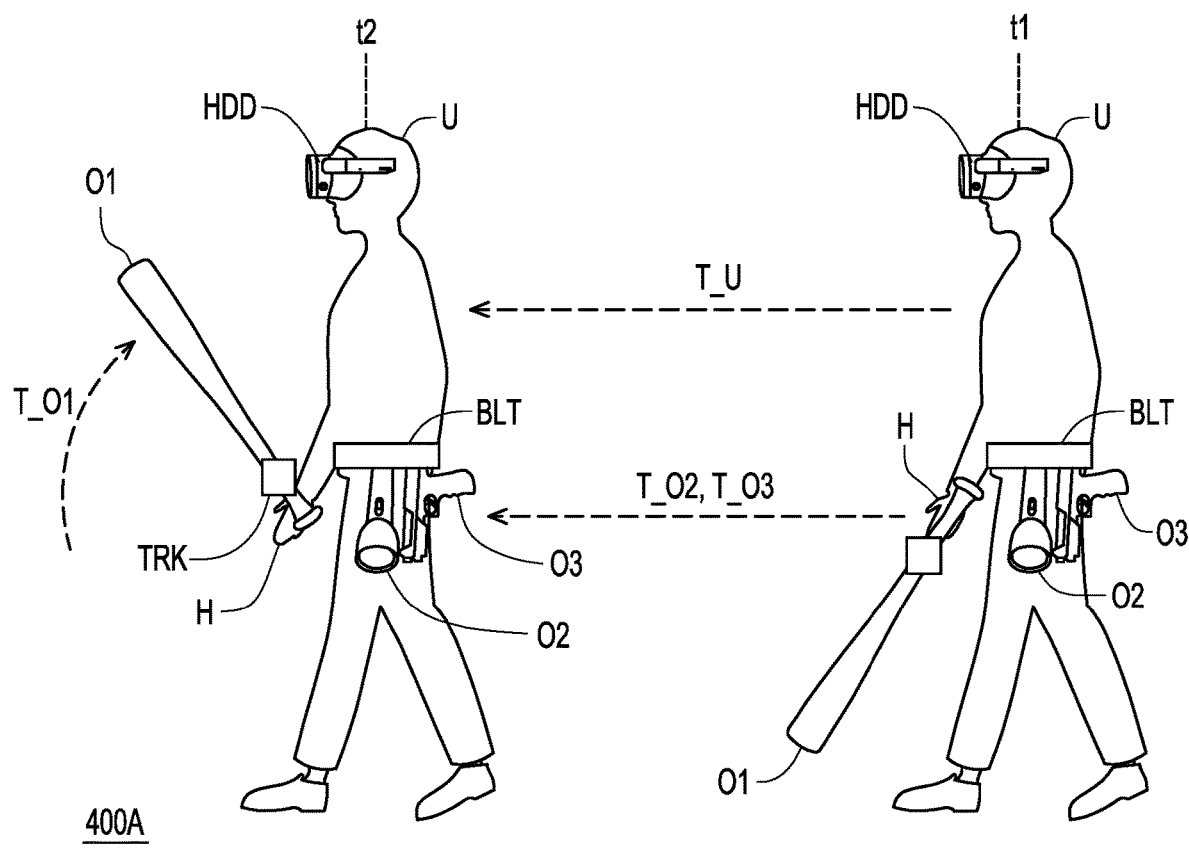
FIG. 4A is a schematic diagram of a hand tracking scenario according to an embodiment of the disclosure.

FIG. 4A is a schematic diagram of a hand tracking scenario according to an embodiment of the disclosure. With reference to FIG. 4A, a hand tracking scenario 400A may include a user U, an object O1, an object O2, and an object O3. The user U may wear a HMD device HDD on the head and a belt BLT around the waist. The object O1 may be held by the hand H of the user U and the object O2 and the object O3 may be hung on the belt BLT. In one embodiment, the object O1 may be also known as the object OBJ, the object O2 or the object O3 may be known as an additional object. However, this disclosure is not limited thereto. In one embodiment, the object O1, the object O2, or the object O3 may be also known as the object OBJ. It is noted that, FIG. 4A has been simplified for the sake of clarity to better understand this disclosure. For example, although it is not depicted, an additional tracker may be placed on the each of the object O2 and the object O3. However, this disclosure is not limited thereto.

In one embodiment, during a period of time (from a time t1 to a time t2), the user U may move from one place to another and a track T_U may represent a moving track of the user during the period of time. Further, a track T_O2 and a track T_O3 may represent a moving track of the object O2 and the object O3 during the period of time respectively. The track T_O2 or the track T_O3 may be also known as an additional object motion curve. Since the object O2 and the object O3 are hung on the belt BLT, the track T_O2 of the object O2 and the track T_O3 may be similar as the track T_U. It is worth mentioned that, during the period of time, the user U may move the object O1 (e.g., raise the object O1 up) and a track T_O1 may represent a movement track of the object O1 during the period of time. That is, the track T_O1 may not be similar as the tracker T_U, the track O2, and/or the track O3. In other words, the processor PCS may be configured to obtain a user motion curve of the user U during the period of time. Further, the processor PCS may be configured to obtain an additional object motion curve of an additional object during the period of time. The additional object is placed on the user. Furthermore, the processor PCS may be configured to: in response to the user being walking, the user motion curve being similar as the additional object motion curve, and the user motion curve being not similar as the object motion curve, determine the object O1 is held by the hand H and the additional object is not held by the hand H. Therefore, which object is held by the user U may be clearly identified, thereby increasing the user experience.

In one embodiment, while the tracker TRK is placed on the object O1, the object O2, or the object O3, a pairing operation between the tracker TRK and the object O1, the object O2, or the object O3 may be performed. By performing the pairing operation, details of the object O1, the object O2, or the object O3 may be obtained and stored in the tracker TRK or the storage circuit SC. The information may be stored as paring information, which may include an object type, an object 3D model, a shape, a size, a color, a function . . . etc. of the object O1, the object O2, or the object O3 (a.k.a. the object OBJ). That is, the processor PCS may be configured to pair the tracker TRK to the object OBJ. Further, the processor PCS may be configured to: in response to the tracker TRK being paired to the object OBJ, generate pairing information. The pairing information may include an object type of the object OBJ. Furthermore, the processor PCS may be configured to determine the object type of the object OBJ based on the pairing information. Therefore, based on the pairing information, the object type of the object OBJ may be obtained and a virtual object correspond to the object type may be displayed correctly in the virtual world. For example, while the object type is determined as a baseball ball, a virtual baseball bat may be displayed in the virtual world. Further, the object 3D model of the object OBJ may be used to allow the virtual baseball bat to faithfully present the shape and size of the object OBJ. However, this disclosure is not limited thereto. In this manner the user experience may be increased.

Figure 4B:
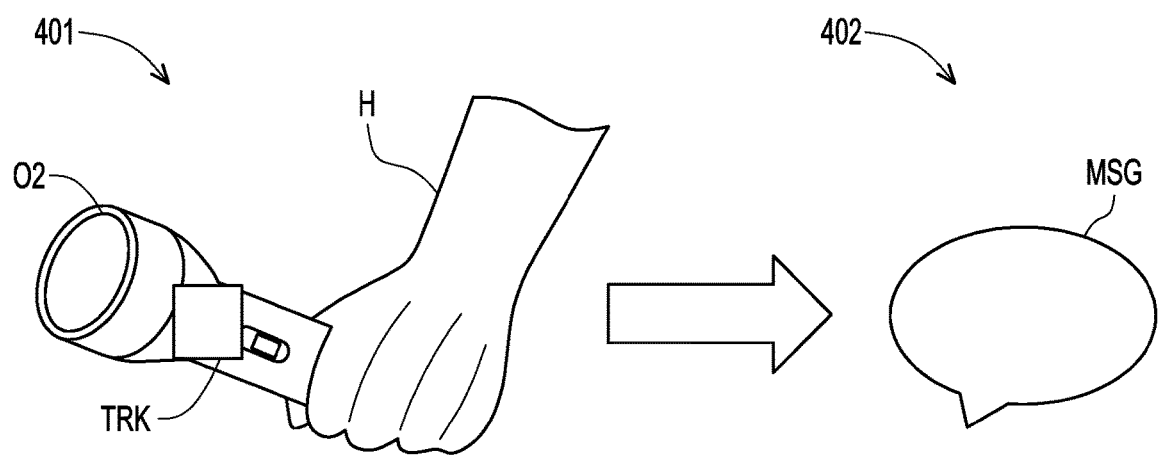
FIG. 4B is a schematic diagram of a hand tracking scenario according to an embodiment of the disclosure.

FIG. 4B is a schematic diagram of a hand tracking scenario according to an embodiment of the disclosure. With reference to FIG. 4B, a hand tracking scenario 400B may include a scenario 401 and a scenario 402. It is noted that, FIG. 4B has been simplified for the sake of clarity to better understand this disclosure. However, this disclosure is not limited thereto.

Reference is first made to the scenario 401. In one embodiment, the hand H may be holding the object O2 instead of the object O1. Similar as the object O1, a tracker TRK may be placed on the object O2. The tracker TRK placed on the object O2 may be also called as an additional tracker. Under certain circumstances, the user U may need to grab one of the object O1, the object O2, and the object O3. For example, the object O1 may be a stick (e.g . . . baseball bat), the object O2 may be a flashlight, and the object O3 may be a pistol. During a police training course, the user U may need to grab a correct object according to an instruction. For instance, the user U may be required to grab the object O1. However, the user U may grab the object O2 instead. That is, the user U may be performing a wrong action different from the instruction.

Reference is now made to the scenario 402. While the user U failed to follow the instruction correctly, a hint message MSG may be generated and provided to the user U. In one embodiment, the hint message MSG may be a visual hint or an audio hint. However, this disclosure is not limited thereto. In one embodiment, the hint message MSG may be: "You are holding a wrong object. Please put the object O2 back and hold the object O1.". In another embodiment, the hint message MSG may be: "You are placing the flashlight in a wrong place. Please move the flashlight to the side of your head and aim the light forward.". That is, the hint message MSG may notify the user U something is wrong and instruct the user how to correct it. In other words, the processor PCS may be configured to: in response to the hand H being holding the object OBJ being determined, provide the hint message MSG to the user U. Therefore, the user U may follow the hint message MSG and perform better during the training or a game, thereby increasing user experience.

Figure 5:
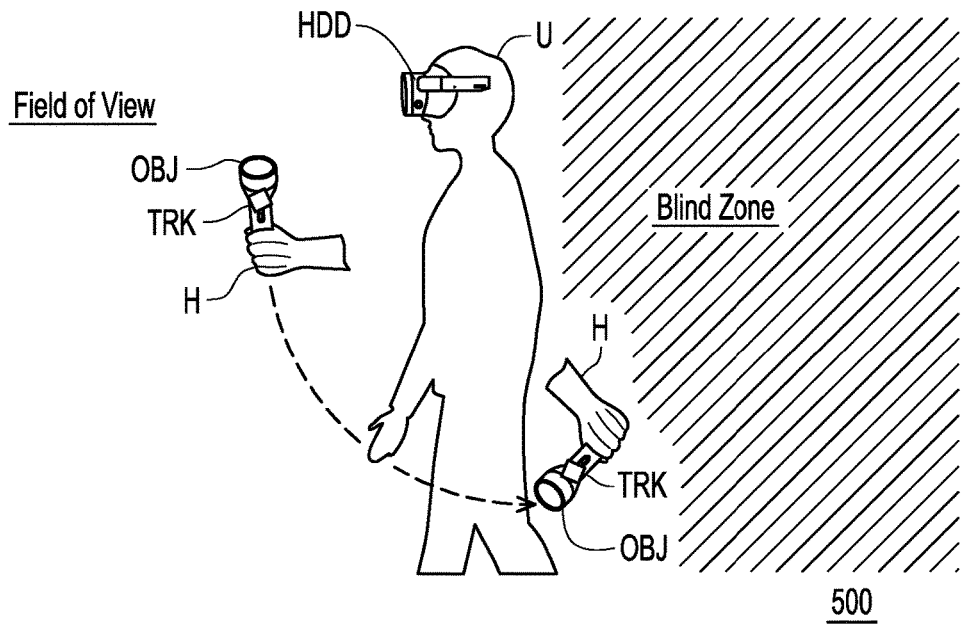
FIG. 5 is a schematic diagram of a hand tracking scenario according to an embodiment of the disclosure.

FIG. 5 is a schematic diagram of a hand tracking scenario according to an embodiment of the disclosure. With reference to FIG. 5, a hand tracking scenario 500 may include the user U and the object OBJ. The user U may wear the HMD device HDD on the head. The object OBJ may be held by the hand H of the user U and the tracker TRK may be placed on the object OBJ.

In one embodiment, the camera CMR may be included in the HMD device HDD. While the user U is wearing the HMD device HDD on the head, an FOV of the camera CMR may be right in front of the user U. On the other hand, a blind zone of the camera CMR may be behind the user U. It is noted that, when the hand H is visible in the FOV, a hand tracking of the hand H may be performed based on image data of the camera CMR. For example, the track T_H of the hand H may be determined based on the image data, and the hand tracking may be performed based on the track T_H. However, when the hand H disappears from the FOV, the hand tracking may not be able to be performed based on the image data.

It is worth mentioned that, since the object OBJ is placed on the hand H, the track T_O of the object OBJ may be similar as the track T_H of the hand H. That is, the track T_O of the object OBJ may be directly used as the track T_H of the hand H or the track T_O of the object OBJ may be converted to the track T_H of the hand H based on a relationship between the object OBJ and the hand H. In other words, the processor PCS may be configured to: in response to the hand H being in the FOV of the camera CMR, perform the hand tracking of the hand H based on the hand motion curve. Further, the processor PCS may be configured to: in response to the hand H being not in the FOV of the camera CMR, perform the hand tracking of the hand H based on the object motion curve. Therefore, even if the hand H is not in the FOV of the camera CMR, the hand tracking may be still performed correctly, thereby increasing the user experience.

Figure 6:
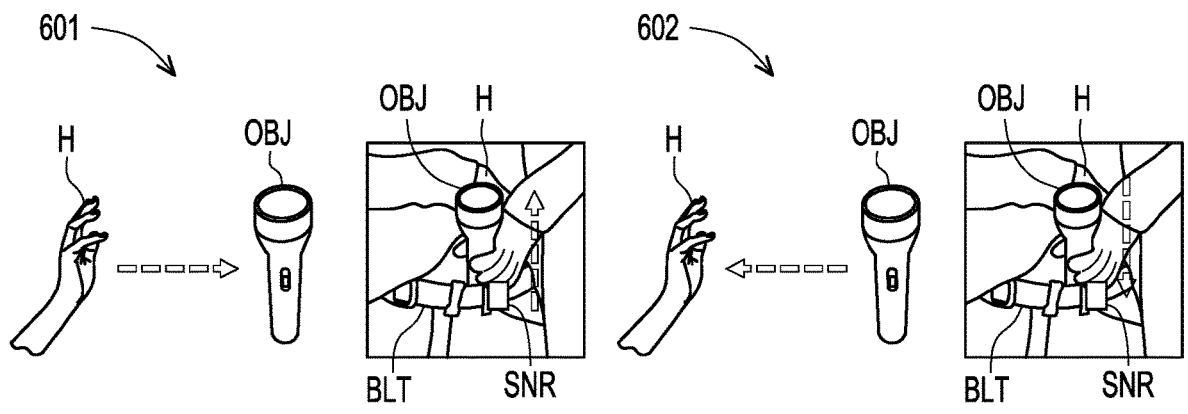
FIG. 6 is a schematic diagram of a hand tracking scenario according to an embodiment of the disclosure.

FIG. 6 is a schematic diagram of a hand tracking scenario according to an embodiment of the disclosure. With reference to FIG. 6, a hand tracking scenario 600 may include a scenario 601 and a scenario 602. The hand tracking scenario 601 may include the hand H and the object OBJ. The user U may wear the belt BLT around the waist. The object OBJ may be placed on the BLT and the tracker TRK may be placed on the object OBJ.

Reference is first made to the scenario 601. When the user U moves the hand H close to the waist to hold the object OBJ, the hand holding algorithm may be triggered (enabled) to determine that whether the hand U is holding the object OBJ or not based on the track T_O and the track T_H. That is, the hand holding algorithm is only activated during a certain period of time (e.g., the time t1 to t2). For example, the processor PCS may be configured to: in response to the hand H being close to the object OBJ, determine whether the hand H is holding the object based on the hand motion curve and the object motion curve. In one embodiment, the term "close" may be defined as a distance between the hand H and the object OBJ is smaller than a threshold value, but is not limited thereto. In other words, the hand holding algorithm may be only enabled during the certain period of time. Therefore, the computing power of the processor PCS may be saved and the overall power consumption may be decreased. In addition, the hand H may not be detected as holding the object OBJ if the hand H is far away from the object OBJ, thereby reducing errors of the hand holding algorithm and increasing the user experience.

Reference is now made to the scenario 602. After the user U puts the object OBJ back to the waist, a distance between the hand H and the object OBJ may increase gradually as the hand H moves away. That is, the hand H is not holding the object OBJ anymore. In other words, the processor PCS may be configured to: in response to the hand H not being close to the object OBJ, determine the hand H is not holding the object OBJ. Therefore, a real-time state of the hand H may be tracked accurately and consistently, which may lead to a better user experience.

It is worth mentioned that, in the scenario 601 and the scenario 602, a sensor SNR may be placed close to the object OBJ. For example, the sensor SNR may be placed on the belt BLT, but is not limited thereto. In one embodiment, the object OBJ may be placed in an object holding area of the belt BLT and the sensor SNR may be placed in the object holding area. For example, the object OBJ may be a pistol and the object holding area is a gun holster. Further, the sensor SNR may be placed in the gun holster to detect whether the pistol is in the gun holster or not. In one embodiment, the sensor SNR may include, for example, a proximity sensor, a touch sensor, a latch, other similar devices include a detection mechanism, or a combination of these device. However, this disclosure is not limited thereto.

That is to say, the sensor SNR may provide sensor data and the sensor data may indicate whether the object OBJ stays in the object holding area or not. In other words, the sensor data may also indicate whether the object OBJ is close to or far away from the sensor SNR. It is noted that, the object OBJ may be only held by the hand H while the object OBJ is not in the object holding area. To put it another way, the processer PCS may be configured to receive sensor data from the sensor SNR. The sensor SNR may be placed close to the object OBJ. Further, the processer PCS may be configured to determine whether the object OBJ is moving away from the sensor SNR based on the sensor data. Furthermore, the processer PCS may be configured to: in response to the object OBJ being moving away from the sensor SNR, determine whether the hand H is holding the object OBJ based on the hand motion curve and the object motion curve. In short, the hand holding algorithm may be only enabled during a period of time (i.e., while the object OBJ being removed from the object holding area is detected). Therefore, the computing power of the processor PCS may be saved and the overall power consumption may be decreased. In addition, the hand H may not be detected as holding the object OBJ if the object OBJ still stays in the object holding area, thereby reducing errors of the hand holding algorithm and increasing the user experience.

To sum up, according to the hand tracking device 100A, the hand tracking system 100B, and the hand tracking method 200, based on the hand motion curve and the object motion curve, whether the hand is holding the object may be determined. That is, a hand holding algorithm may be performed based on the hand motion curve and the object motion curve. Therefore, while the object OBJ is involved, the hand tracking of the hand H may be still performed in a natural and intuitive way, thereby bringing a fully immersive experience to the user.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A hand tracking device, comprising:
a storage circuit, storing a program code; and
a processor, coupled to the storage circuit and accessing the program code to execute:
receiving sensor data from a sensor, wherein the sensor is placed close to an object;
obtaining a hand motion curve of a hand during a period of time;
determining whether the object is moving away from the sensor based on the sensor data;
obtaining an object motion curve of the object during the period of time; and
in response to the object being moving away from the sensor, determining whether the hand is holding the object based on the hand motion curve and the object motion curve.

2. The hand tracking device according to claim 1, wherein the processor is further configured to access the program code to execute:
determining a similarity between the hand motion curve and the object motion curve; and
determining whether the hand is holding the object based on the similarity.

3. The hand tracking device according to claim 2, wherein the processor is further configured to access the program code to execute:
in response to the similarity being higher than a predetermined threshold value, determining that the hand is holding the object.

4. The hand tracking device according to claim 2, wherein the processor is further configured to access the program code to execute:
in response to the similarity not being higher than a predetermined threshold value, determining that the hand is not holding the object.

5. The hand tracking device according to claim 1, wherein the processor is further configured to access the program code to execute:
obtaining an additional hand motion curve of an additional hand during the period of time;
determining whether the hand or the additional hand is holding the object based on the hand motion curve, the additional hand motion curve, and the object motion curve.

6. The hand tracking device according to claim 1, wherein the processor is further configured to access the program code to execute:
receiving image data from a camera;
determining the hand motion curve based on the image data;
receiving tracker data from a tracker, wherein the tracker is adapted to be placed on the object; and
determining the object motion curve based on the tracker data.

7. The hand tracking device according to claim 1, wherein the processor is further configured to access the program code to execute:
displaying a virtual hand and a virtual object in a virtual world;
moving the virtual hand based on the hand motion curve; and
moving the virtual object based on the object motion curve.

8. The hand tracking device according to claim 1, wherein the processor is further configured to access the program code to execute:
pairing a tracker to the object, wherein the tracker is adapted to be placed on the object;
in response to the tracker being paired to the object, generating pairing information, wherein the pairing information comprises an object type of the object; and
determining the object type of the object based on the pairing information.

9. The hand tracking device according to claim 1, wherein the processor is further configured to access the program code to execute:
obtaining a user motion curve of a user during the period of time;
obtaining an additional object motion curve of an additional object during the period of time, wherein the additional object is placed on the user; and
in response to the user being walking, the user motion curve being similar as the additional object motion curve, and the user motion curve being not similar as the object motion curve,
determining the object is held by the hand and the additional object is not held by the hand.

10. The hand tracking device according to claim 1, wherein the processor is further configured to access the program code to execute:
in response to the hand being holding the object being determined, providing a hint message to a user.

11. The hand tracking device according to claim 1, wherein the processor is further configured to access the program code to execute:
in response to the hand being in a field of view of a camera, performing a hand tracking of the hand based on the hand motion curve; and
in response to the hand not being in the field of view of the camera, performing the hand tracking of the hand based on the object motion curve.

12. The hand tracking device according to claim 1, wherein the processor is further configured to access the program code to execute:
in response to the hand being close to the object, determining whether the hand is holding the object based on the hand motion curve and the object motion curve.

13. The hand tracking device according to claim 1, wherein the processor is further configured to access the program code to execute:
   in response to the hand not being close to the object, determining the hand is not holding the object.

14. The hand tracking device according to claim 1, wherein the processor is further configured to access the program code to execute:
   displaying a virtual hand and a virtual object in a virtual world; and
   in response to the hand being holding the object being determined, displaying the virtual hand being holding the virtual object in the virtual world.

15. A hand tracking system, comprising:
   a camera, configured to provide image data;
   a tracker, configured to provide tracker data, wherein the tracker is adapted to be placed on an object;
   a storage circuit, storing a program code; and
   a processor, coupled to the storage circuit and accessing the program code to execute:
      receiving sensor data from a sensor, wherein the sensor is placed close to an object;
      receiving the image data from the camera;
      determining a hand motion curve of a hand during a period of time based on the image data;
      determining whether the object is moving away from the sensor based on the sensor data;
      obtaining an object motion curve of the object during the period of time; and
      in response to the object being moving away from the sensor, determining whether the hand is holding the object based on the hand motion curve and the object motion curve.

16. The hand tracking system according to claim 15, wherein the processor is further configured to access the program code to execute:
   determining a similarity between the hand motion curve and the object motion curve; and
   determining whether the hand is holding the object based on the similarity.

17. The hand tracking system according to claim 16, wherein the processor is further configured to access the program code to execute:
   in response to the similarity being higher than a predetermined threshold value, determining that the hand is holding the object.

18. The hand tracking system according to claim 16, wherein the processor is further configured to access the program code to execute:
   in response to the similarity not being higher than a predetermined threshold value, determining that the hand is not holding the object.

19. A hand tracking method, comprising:
   receiving sensor data from a sensor, wherein the sensor is placed close to an object;
   obtaining a hand motion curve of a hand during a period of time;
   determining whether the object is moving away from the sensor based on the sensor data;
   obtaining an object motion curve of the object during the period of time; and
   in response to the object being moving away from the sensor, determining whether the hand is holding the object based on the hand motion curve and the object motion curve.

* * * * *